United States Patent [19]

Nakao et al.

[11] Patent Number: 4,803,674
[45] Date of Patent: Feb. 7, 1989

[54] MAGNETO-OPTICAL RECORDER WITH SMALL-SIZED, LOW-POWERED ELECTROMAGNETIC COIL

[75] Inventors: Takeshi Nakao, Sagamihara; Yutaka Akiba, Fujisawa, both of Japan

[73] Assignee: Hitachi, Ltd., Tokyo, Japan

[21] Appl. No.: 932,578

[22] Filed: Nov. 20, 1986

[30] Foreign Application Priority Data

Nov. 20, 1985 [JP] Japan .................. 60-258535

[51] Int. Cl.$^4$ .................. G11B 11/14; G11B 13/04
[52] U.S. Cl. .................. 369/13; 360/114; 360/59; 365/122
[58] Field of Search .................. 369/13; 360/114, 59; 365/122

[56] References Cited

U.S. PATENT DOCUMENTS

| | | | |
|---|---|---|---|
| 2,276,200 | 3/1942 | Kauffmann | 360/123 |
| 2,591,070 | 4/1952 | Howell | 360/123 |
| 2,702,835 | 2/1955 | Camras | 360/123 |
| 4,414,554 | 11/1983 | Springer | 360/123 |
| 4,513,406 | 4/1985 | Ishihara | 369/44 |
| 4,644,432 | 2/1987 | Heim | 360/123 |
| 4,667,260 | 5/1987 | Perlow et al. | 360/123 |

FOREIGN PATENT DOCUMENTS

| | | | |
|---|---|---|---|
| 57-94906 | 6/1982 | Japan | 369/13 |
| 59-119507 | 7/1984 | Japan | 360/114 |
| 59-172175 | 9/1984 | Japan | 369/13 |
| 60-147948 | 8/1985 | Japan | 360/114 |
| 60-214439 | 10/1985 | Japan | 360/114 |
| 60-214438 | 10/1985 | Japan | 360/114 |
| 61-148687 | 7/1986 | Japan | 369/13 |

Primary Examiner—Aristotelis M. Psitos
Assistant Examiner—Hoa T. Nguyen
Attorney, Agent, or Firm—Antonelli, Terry & Wands

[57] ABSTRACT

A magneto-optical recorder is disclosed in which an external magnetic field required for recording and erasing can be produced by a small-sized electromagnetic coil having a small magneto-motive force. The electromagnetic coil is made up of a magnetic core and a coil winding, and the outer peripheral portion of the coil winding other than that peripheral portion thereof which confronts a recording medium, is covered by a core material. A magnetic field emanating from the electromagnetic coil spreads in a narrow space, and can be applied to the recording medium with large intensity even when the electromagnetic coil has a small magneto-motive force. In the recorder, a magnetic body is disposed such that the electromagnetic coil and the magnetic body face each other, to concentrate the magnetic field generated by the electromagnetic coil, to the vicinity of that portion of the recording medium which is irradiated with a light spot. The length of the electromagnetic coil is made equal to or greater than the length of the recording area of the recording medium, to apply a substantially uniform magnetic field to the whole recording area without moving the electromagnetic coil.

22 Claims, 4 Drawing Sheets

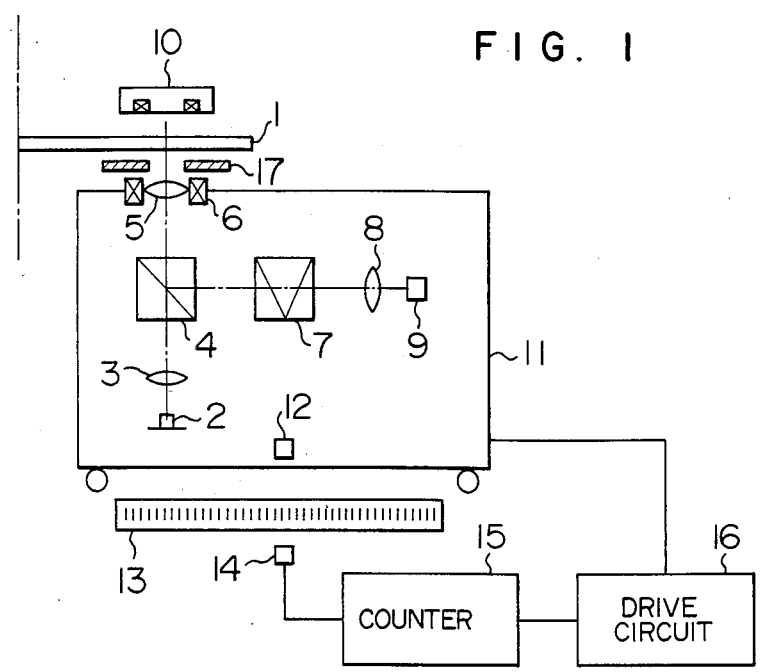
FIG. 1
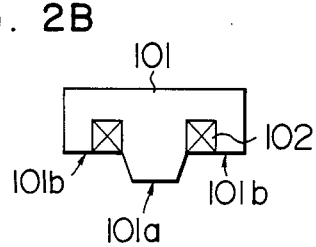
FIG. 2B
FIG. 2A
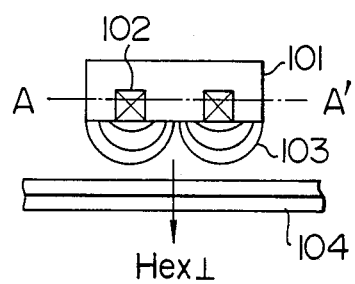
FIG. 2C
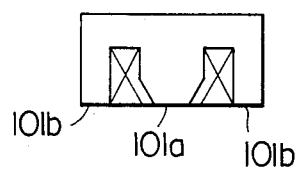
FIG. 2D
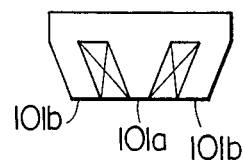

MAGNETO-OPTICAL RECORDER WITH SMALL-SIZED, LOW-POWERED ELECTROMAGNETIC COIL

BACKGROUND OF THE INVENTION

The present invention relates to a magneto-optical recorder, and more particularly to a magneto-optical recorder in which a magnetic field required for recording and erasing can be generated by a small-sized electromagnetic coil having a small magneto-motive force.

External magnetic field generating means in a conventional magneto-optical disc apparatus is described in an article entitled "Amorphous thin film disk for magneto-optical memory" (SPIE, Vol. 329, page 208, Optical Disc Technology, 1982). The conventional magneto-optical disc apparatus, as shown in FIG. 10, includes a recording-reproducing optical system 11 and an electromagnetic coil 10, and a focusing lens 5 is disposed so as to face the electromagnetic coil 10 through an optical disc 1. In this disc apparatus, the electromagnetic coil 10 for generating an external magnetic field is made up of a magnetic core 101 and a coil winding 102 provided around the core 101, or is formed of an air-core coil. Accordingly, a magnetic field 103 generated by the electromagnetic coil 10 spreads over a wide space, and hence the magnetic field 103 is low is efficiency for producing a magnetic field component $H_{ex\perp}$ applied perpendicularly to a recording film 100 on the optical disc. In order to apply the magnetic field component $H_{ex\perp}$ having a desired intensity to the recording film, the electromagnetic coil 10 is required to have a large magneto-motive force. This makes it impossible to make the electromagnetic coil small in size and low in power consumption.

SUMMARY OF THE INVENTION

An object of the present invention is to provide a magneto-optical recorder including magnetic field generating means which is small in size and low in power consumption, and can generate an external magnetic field having a desired intensity even with a small magneto-motive force.

Another object of the present invention is to provide a magneto-optical recorder in which an electromagnetic coil for generating an external magnetic field is not required to move together with an optical head, and thus quick access of the optical head to a desired location is possible.

According to an aspect of the present invention, there is provided a magneto-optical recorder including an electromagnetic coil in which the outer surface of a coil winding other than that confronting a recording medium, is covered by a core material.

When the core material is disposed around the outer peripherial portion of the coil winding other than that peripheral portion thereof which confronts the recording medium, to embed the coil winding into the core material, an external magnetic field generated by the electromagnetic coil spreads within a relatively narrow space, and is utilized efficiently. Thus, a strong magnetic field can be applied to the recording medium even when the magneto-motive force of the electromagnetic coil is made small.

Further, according to another aspect of the present invention, a magnetic body is disposed so as to face the electromagnetic coil through an optical disc, to concentrate the magnetic field generated by the electromagnetic coil to the vicinity of that part of the recording medium, on which a light beam is focused.

According to a further aspect of the present invention, the length of the electromagnetic coil is made equal to or greater than the length of a recording area of the recording medium, to apply substantailly uniform magnetic field to the whole recording area without moving the electromagnetic coil.

These and other objects and many of the attendant advantages of the present invention will be readily appreciated and become better understood by reference to the following detailed description when considered in connection with the accompanying drawings.

BRIEF DESCRIPTION OF THE DRAWINGS

FIG. 1 is a schematic diagram showing the construction of an embodiment of a magneto-optical recorder according to the present invention.

FIGS. 2A to 2D, 3A and 3B are diagrams showing various examples of the electromagnetic coil 10 of FIG. 1.

DESCRIPTION OF THE PREFERRED EMBODIMENTS

Figure 3A:
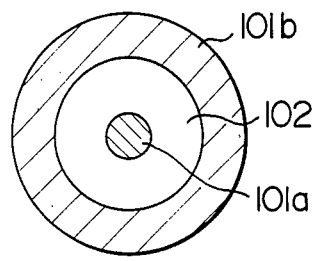

FIG. 1 shows an embodiment of a magneto-optical recorder according to the present invention which embodiment is a magneto-optical disc apparatus. Referring to FIG. 1, a magneto-optical disc 1 includes a recording film exhibiting a magneto-optical effect and a perpendicular uniaxial anisotropy. Light emitted from a semiconductor laser 2 is converted by a collimator lens 3 into a collimated beam, which is passed through a beam splitter 4 and is then focused by a focusing lens 5 on the disc 1 so that a fine beam spot is formed thereon. The focusing lens 5 is mounted on a lens actuator 6 such as a voice coil, to move the lens 5 vertically in accordance with the vertical vibration of the disc 1. The light reflected back from the disc 1 is passed through the focusing lens 5, is reflected from the beam splitter 4, and then is incident on an analyzer 7. The analyzer 7 transmits only a light component having a specified plane of polarization. Accordingly, the planes of polarization of the reflected light corresponding to upwardly and downwardly perpendicular magnetization at the recording film are converted by the analyzer 7 into different transmitted light quantities. The light emerging from the analyzer 7 is focused by a lens 8 on the photodetector 9, to be converted into an electrical signal.

In order to record information in the recording film, a current supplied to the semiconductor laser 2 is is modulated by an information signal to be recorded, and the perpendicularly magnetized recording film is irradiated with a laser beam which is intensity-modulated in accordance with the information signal, to locally heat the recording film to a temperature higher than a Curie temperature, thereby extinguishing the existing magnetization and generating desired magnetization by an external magnetic field for recording. While, in an erasing operation, an external magnetic field opposite in direction to the external magnetic field for recording, is applied to the recording film while irradiating the recording film with the laser beam of a constant intensity. An external magnetic field is generated by the electromagnetic coil 10. Further, a magnetic body 17 is disposed so as to face the electromagnetic coil 10 through the disc 1. An example of the shape of the electromagnetic coil 10 and an example of the structure of the magnetic body 17 are shown in FIG. 1. The coil 10 can have various shapes and the magnetic body 17 can take various structures, as will be mentioned later.

An optical head 11 is movable radially of the disc 1, to locate the light spot at a position where information is to be recorded. The moving distance or the current position of the optical head 11 can be detected with the aid of a scale such as a moiré scale. In the present embodiment, a light source 12 and a photodetector 14 are disposed on opposite sides of a transmission-type moiré scale 13. When the optical head 11 moves in the above direction, a counter 15 counts up pulses outputted from the photodetector 14 and corresponding to those patterns on the moiré scale 13, through which a light beam from the light source 12 has passed, to detect the current position of the optical head 11. A drive circuit 16 moves the optical head 11 to a desired position on the basis of information on the current detected position.

It is not specifically shown in FIG. 1 how the electromagnetic coil 10 is set in the present embodiment. For example, the electromagnetic coil 10 may be fixed to the back side of a disc cover or may be mounted on a movable arm so that the coil 10 will not disturb loading and unloading of the disc 1.

Figure 10:
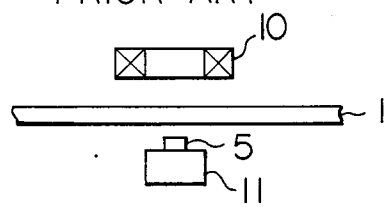
FIG. 10 is a diagram showing magnetic field generating means in a conventional magneto-optical disc apparatus.
Figure 11:
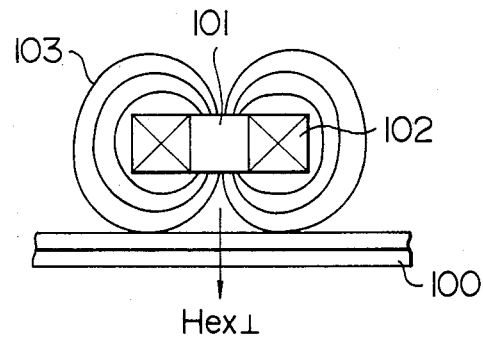
FIG. 11 is a diagram showing the distribution of the magnetic field generated by the electromagnetic coil of FIG. 10.

Now, the structure of the electromagnetic coil 10 will be explained below in detail, with reference to FIGS. 2A to 2D. The coil 10 is made up of a magnetic core 101 which is made of a magnetic material such as ferrite and iron, and a coil winding 102. The magnetic field generated by the conventional electromagnetic coil of FIG. 10 spreads in a wide space, and thus the magnetic energy produced by an energizing current is distributed within the wide space. Accordingly, the intensity of the magnetic field applied to the recording film on the disc 1 is small. In order to obtain a large field intensity at the recording film by the same magneto-motive force in the above case, it is necessary to restrict a space where the magnetic field is spread. According to the present invention, in order to make narrow a space where the magnetic field is spread, without weakening a magnetic field component $H_{ex\perp}$ applied to the disc in a direction perpendicular thereto, the outer peripheral portion of the coil winding other than that peripheral portion thereof which confronts the disc 1, is covered by a core material, as shown in FIG. 2A. Thus, a space where the magnetic field spreads, is limited as in FIG. 2A, and the energy density of the magnetic field is increased. Hence, a magnetic field having a desired intensity at the disc 1 can be produced even when the electromagnetic coil has a small magneto-motive force, that is, even when a small energizing current is supplied to the electromagnetic coil. Further, a main pole 101a of the magnetic core 101 may be tapered into a small tip, as shown in FIGS. 2B to 2D, to concentrate the magnetic field to the small tip.

FIG. 2B shows a case where the tip of the main pole 101a projects from a plane corresponding to the end surface of the coil winding 102 and the core 101 has a sub-pole or side wall 101b covering the outer peripheral surface of the coil winding 102 so that the coil winding 102 is embedded in the core material. FIG. 2C shows a case where the tip of the tapered main pole 101a and the end surface of the coil winding and the end surface of the sub-pole 101b are in the same plane. FIG. 2D shows a case where the side wall or the sub-pole 101b and the coil-winding receiving recess of the magnetic core are both tapered so as to have the same slope as the tapered main pole 101a.

Now, the core material provided around the coil winding 102 (namely, the sub-pole 101b of the magnetic core 101) will be explained below, with reference to FIGS. 3A and 3B. FIG. 3A shows a cross section taken along the line A—A' of FIG. 2A. That is, the coil winding 102 is provided around the main pole 101a, and at this cross section, the sub-pole 101b, is provided around the whole outer periphery of the coil winding 102.

Figure 3B:
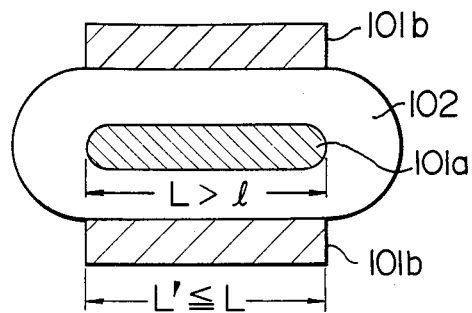

FIG. 3B shows a case where the electromagnetic coil 10 is elongated in a radial direction of the disc 1, as will be explained later with reference to FIGS. 9A to 9C. In the coil of FIG. 3B, in order to apply a uniform magnetic field to a recording area of the disc 1 corresponding to the moving range of the focusing lens 5, the length L of the main pole 101a in the radial direction of the disc 1 is made equal to or greater than the length l of the recording area in the above direction, and the length L' of the sub-pole 101b is made equal to or less than the length L of the main pole 101a. It is needless to say that the coil winding 102 may be enclosed by the sub-pole 101b, as in FIG. 3A.

Figure 4:
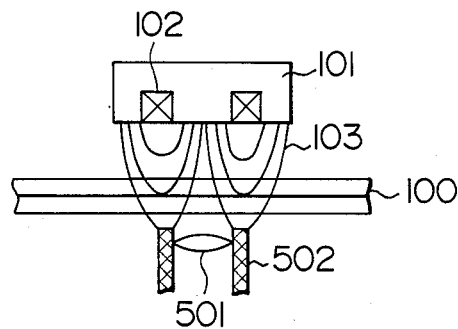
FIGS. 4, 5A, 5B, 6, 7 and 8 are diagrams showing modified versions of the magnetic body of FIG. 1.

Next, an example of the arrangement of the electromagnetic coil 10 and the magnetic body 17 will be explained, with reference to FIG. 4. FIG. 4 shows a case where the holder 502 of a focusing lens 501 (corresponding to the focusing lens 5 of FIG. 1) is made of a magnetic material, to serve as the magnetic body 17. In the case, the magnetic field generated by the electromagnetic coil is concentrated to the holder 502, and thus the magnetic field component applied to a recording film 100 in a direction perpendicular thereto is far stronger than that applied to the recording film when the holder 502 is made of a non-magnetic material.

Figure 5A:
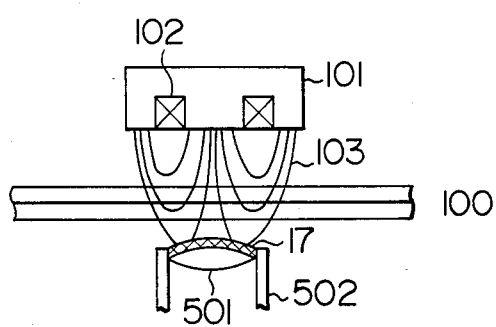
Figure 5B:
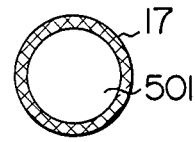

FIGS. 5A and 5B show other examples of the arrangement of the electromagnetic coil 10 and the magnetic body 17. FIG. 5A shows a case where a magnetic layer 17 is formed on the focusing lens 501 by painting or evaporation. For example, the surface of the lens 501 may be coated with transparent, ferromagnetic multi-component glass. Further, in the case where an opaque, ferromagnetic material 17 is used, the material 17 may be evaporated on an edge portion of the lens 501, as shown in FIG. 5B.

Figure 6:
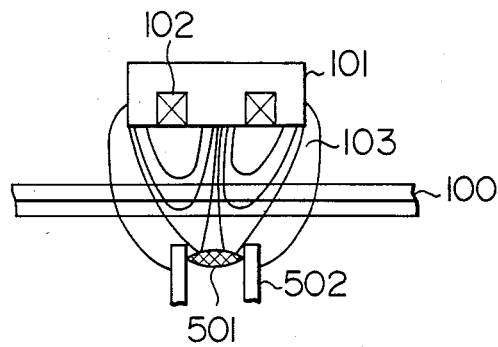

FIG. 6 shows a different example of the arrangement of the electromagnetic coil and the magnetic body. In the example of FIG. 6, the focusing lens 501 itself is made of the above-mentioned, transparent, ferromagnetic multi-component glass.

Figure 7:
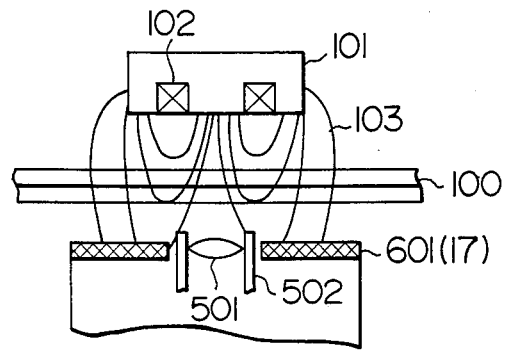

FIG. 7 shows still another example of the arrangement of the electromagnetic coil and the magnetic body. In the example of FIG. 7, an upper lid portion 601 of the focusing-lens actuator 6 is made of a magnetic material, to serve as the magnetic body 17. Alternatively, the magnetic material may be deposited on the upper lid portion 601 by painting or evaporation. According to such arrangements, the leakage field resulting from a magnet which is provided within the actuator to move the focusing lens 501, can be cut off by the above magnetic material.

Figure 8:
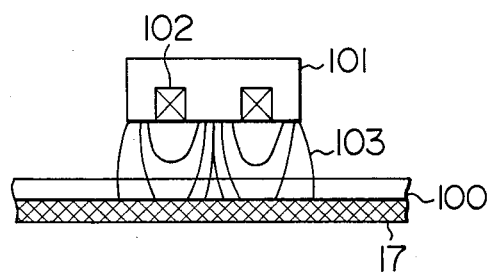

FIG. 8 shows still a further example of the arrangement of the electromagnetic coil and the magnetic body. In the present example, the disc is formed in such a manner that the recording film 100 is interposed between a disc substrate and a transparent, ferromagnetic film 17, and is disposed so that the disc substrate faces the electromagnetic coil. In this case, the ferromagnetic film 17 may be kept in contact with the recording film 100. Alternatively, the disc may be made up of the disc substrate formed of a transparent, ferromagnetic material, and the recording film formed on the disc substrate.

In the foregoing explanation, no special attention has been paid to the size of the electromagnetic coil. The coil may be elongated radially of the disc, as will be described below.

Figure 9A:
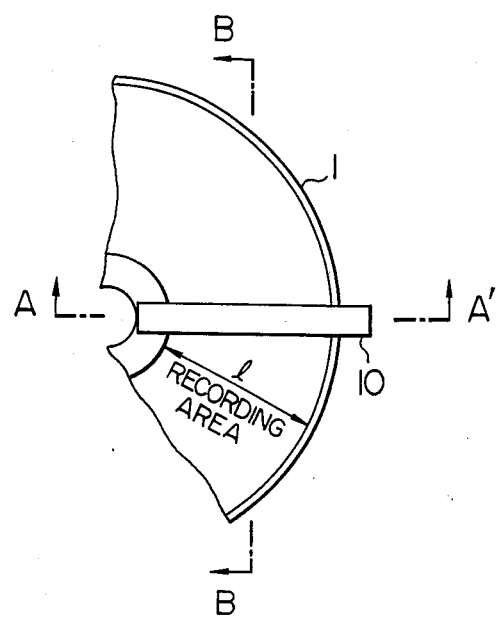
FIGS. 9A to 9C are diagrams showing part of another embodiment of a magneto-optical recorder according to the present invention.
Figure 9B:
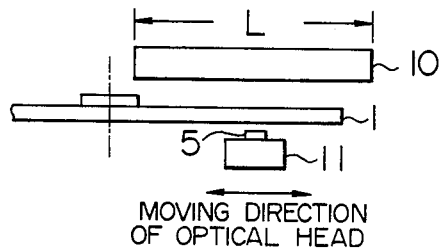
Figure 9C:
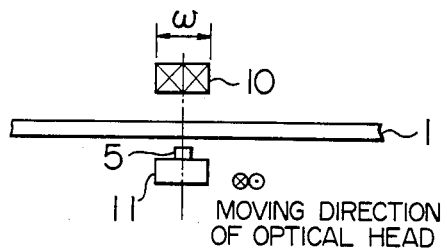

FIG. 9A is a diagram of a portion of another embodiment of a magnetic-optical recorder according to the present invention, viewed in a direction perpendicular to the disc 1. FIG. 9B shows a cross section taken along the line A—A' of FIG. 9A, and FIG. 9C shows a cross section taken along the line B—B' of FIG. 9A. As shown in FIGS. 9A to 9C, the electromagnetic coil 10 elongated radially of the disc 1 is disposed so as to face the focusing lens 5 through the disc 1, and the length L of the coil 10 in the radial direction is made equal to or greater than the length of a recording area in this direction, that is, the length of the moving range of the focusing lens 5, to generate a uniform magnetic field all over the recording area. The width w of the coil 10 is selected so that the magnetic field at a small area on the disc 1 where a fine beam spot is formed, is uniform in a direction parallel to the line B—B'. Such an electromagnetic coil is not required to move together with the focusing lens 5, and thus quick access of the optical head 11 to a desired location can be performed.

As has been explained in the foregoing, according to the present invention, the outer periphery of the coil winding of an electromagnetic coil is covered by a core material, to make narrow an external space, within which the magnetic field generated by the electromagnetic coil spreads, thereby increasing the energy density of the magnetic field. Accordingly, a desired field intensity can be obtained at a recording position by a coil with a small magneto-motive force, and hence the electromagnetic coil for generating an external magnetic field can be made small in size and low in power consumption.

Further, according to the present invention, a magnetic body is disposed so as to face the electromagnetic coil through a recording film, and thus the magnetic field generated by the electromagnetic coil is concentrated to the vicinity of a small area on the disc where a fine beam spot is formed.

What is claimed is:

1. A magneto-optical recorder for use with a recording medium having a magnetic recording film, comprising:
   an optical head for irradiating said recording medium with a light beam, and including a focusing lens for focusing said light beam on said recording medium; and
   magnetic field generating means disposed in a facing relation with said focusing lens through said recording medium, for generating a magnetic field, said magnetic field generating means including an electromagnetic coil, said electromagnetic coil including a magnetic core having a magnetic main pole and a magnetic sub-pole and a coil winding, said coil winding being wound on said magnetic main pole and at least a part of said magnetic sub-pole contacting at least a part of a periphery of said coil winding wherein said magnetic sub-pole of said magnetic core has a length in a direction transverse to the recording and reproducing direction on said recording medium which is smaller than the length of said magnetic main pole of said magnetic core.

2. A magneto-optical recorder according to claim 1, wherein a central portion of said magnetic main pole surrounded by said coil winding is tapered into a small tip in a direction toward said recording medium, to concentrate the magnetic field generated by said electromagnetic coil to said recording medium.

3. A magneto-optical recorder according to claim 1, wherein said magnetic main pole has a length in a direction transverse to a recording and reproducing direction on said recording medium sufficient to apply a substantially uniform magnetic field to the whole recording area of said recording medium.

4. A magneto-optical recorder according to claim 1, wherein a magnetic body is disposed so as to face said electromagnetic coil through said recording medium.

5. A magneto-optical recorder according to claim 4, wherein said magnetic body is a holder of said focusing lens, said holder being made of a magnetic material.

6. A magneto-optical recorder according to claim 4, wherein said magnetic body is a magnetic layer formed on said focusing lens.

7. A magneto-optical recorder according to claim 4, wherein said focusing lens has a portion made of a transparent magnetic material, for serving as said magnetic body.

8. A magneto-optical recorder according to claim 4, wherein a focusing-lens actuator is provided to have an upper lid portion made of a magnetic material for serving as said magnetic body.

9. A magnetic-optical recorder according to claim 4, wherein said recording medium includes thereon a magnetic layer serving as said magnetic body.

10. A magneto-optical recorder according to claim 1, further comprising scale means for generating pulses corresponding to a movement distance of said optical head, and position control means for counting up said pulses to detect said movement distance and for controlling the position of said optical head on the basis of said movement distance.

11. A magneto-optical recorder according to claim 1, wherein information is recorded on said recording medium by applying to said recording medium a light beam which is emitted from said optical head and is intensity-modulated in accordance with said information, while applying a magnetic field which is generated by said magnetic field generating means and has a predetermined direction, to said recording medium.

12. A magneto-optical recorder according to claim 3, wherein said coil winding is embedded in said magnetic core so that at least portions of said coil winding facing said recording medium are exposed.

13. A magneto-optical recording according to claim 12, wherein said recording medium is disc-shaped and said magnetic main pole and said magnetic sub-pole have the length thereof extending in a radial direction of said disc-shaped recording medium.

14. A magneto-optical recorder according to claim 1, wherein said coil winding includes portions disposed between said magnetic main pole and said magnetic sub-pole with said magnetic main pole and said magnetic sub-pole adjoining at least oppositely facing portions of the periphery of said coil winding.

15. A magneto-optical recorder for use with a recording medium having a magnetic recording film comprising:
an optical head for irradiating said recording medium with a light beam, and including a focusing lens for focusing said light beam on said recording medium; and
magnetic field generating means disposed in a facing relation with said focusing lens through said recording medium, for generating a magnetic field, said magnetic field generating means including an electromagnetic coil, said electromagnetic coil including a main pole, a winding wound around said magnetic main pole and a magnetic side wall portion contacting at least part of the periphery of said winding, said magnetic main pole having a length in a direction transverse to a recording and reproducing direction on said recording medium sufficient to apply a substantially uniform magnetic field to the whole recording area of said recording medium, and said magnetic side wall portion having a length in a direction transverse to a recording and reproducing direction on said recording medium smaller than the length of said magnetic main pole.

16. A magneto-optical recorder according to claim 15, wherein said optical head includes a holder for supporting said focusing lens, said holder being formed of a magnetic material in a facing relation with said electromagnetic coil.

17. A magneto-optical recorder according to claim 15, wherein a magnetic body is disposed so as to face said electromagnetic coil through said recording medium.

18. A magneto-optical recorder according to claim 17, wherein said magnetic body is a magnetic layer formed on said focusing lens.

19. A magneto-optical recorder according to claim 17, wherein said focusing lens has a portion made of a transparent magnetic material, for serving as said magnetic body.

20. A magneto-optical recorder according to claim 17, wherein a focusing-lens actuator is provided to have an upper lid portion made of a magnetic material for serving as said magnetic body.

21. A magneto-optical recorder according to claim 17, wherein said recording medium includes thereon a magnetic layer serving as said magnetic body.

22. A magnetic-optical recorder according to claim 15, wherein said magnetic side wall portion is a magnetic sub-pole adjoining the periphery of said winding and cooperates with said magnetic main pole for covering said winding so that only a portion of said winding facing said recording medium is exposed.

* * * * *